Figure 1:
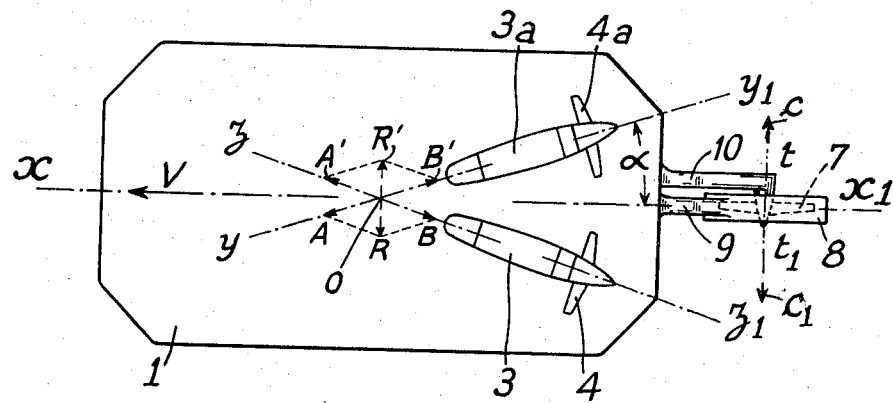

United States Patent
Grihangne

[11] 3,802,532
[45] Apr. 9, 1974

[54] AIR-CUSHION VEHICLES
[76] Inventor: Andre Grihangne, 186, Avenue Victor Hugo, Paris, France
[22] Filed: Oct. 28, 1971
[21] Appl. No.: 193,317

[30] Foreign Application Priority Data
Apr. 11, 1970 France.............................. 70.39704

[52] U.S. Cl................................. 180/118, 244/55
[51] Int. Cl............................................. B60v 1/00
[58] Field of Search ........... 180/116, 117, 118, 120; 244/55

[56] References Cited
UNITED STATES PATENTS
3,090,455  5/1963  Crowley.............................. 180/117
3,153,461  10/1964  Bollum................................ 180/117
3,265,142  8/1966  Winter................................. 180/117

FOREIGN PATENTS OR APPLICATIONS
372,632  1/1918  Germany.............................. 244/55

Primary Examiner—Gerald M. Forlenza
Assistant Examiner—D. W. Keen
Attorney, Agent, or Firm—Clelle W. Upchurch

[57] ABSTRACT

This invention relates to air-cushion vehicles and to propulsion and steering apparatus for such vehicles which comprises means for generating and regulating a lateral control force and means for controlling yaw. As described, an air-cushion vehicle has two overhead propellers arranged at the rear of the vehicle symmetrically with respect to its longitudinal axis. The axes of the propellers form an acute angle with said longitudinal axis and converge at a point on the vertical axis through the centre of gravity of the vehicle.

3 Claims, 3 Drawing Figures

AIR-CUSHION VEHICLES

This invention relates to air-cushion vehicles (craft) and more particularly to the propulsion and steering of such vehicles.

The problems of steering stability which are posed by amphibious air-cushion vehicles are more severe than with the majority of other types of vehicles. Large moments and forces arise from hydrodynamic contact and from aerodynamic disturbances and these have to be balanced aerodynamically. To this end, it is desirable to provide means for controlling the vehicle, such for producing lateral control forces and moments of yaw.

In accordance with the invention, there is provided, in an air-cushion vehicle means for generating and regulating a lateral control force and means for controlling yaw.

In order to counter a strong side wind whilst the vehicle is being manoeuvred at low speed or when it is stationary, it is considered necessary to develop a lateral control force which should be as much as 25 percent of the total thrust of the propellers.

For known machines, this lateral force is generated either by suitably orientating the propeller supports and/or by ejecting air from the cushion through suitable vents. However, this procedure is complicated by the necessity of providing means for orientating the propeller supports and due to the fact that the provision of the vents affects the performance of the air cushion.

According to a feature of the invention, the propulsion and steering device includes at least two overhead driving propellers arranged at the rear of the vehicle symmetrically with respect to its longitudinal axis, the axes of said propellers forming an acute angle with said longitudinal axis of the vehicle and converging towards the vertical axis of symmetry of the vehicle situated at or adjacent the centre of gravity.

This solution has very great simplicity and complete reliability and does not affect the performance of the air-cushion, as in the case where vents are provided.

By adjusting the pitches of the two propellers in one direction then in the other a variable resultant, applied at the centre of gravity, is obtained which can be directed in any azimuth whatsoever from 0° to 360°.

In some circumstances, the force generated by the two propellers would be sufficient to counter a strong cross wind when the vehicle is hovering but stationary, more especially where the vehicle is generally circular in shape, by virtue of the fact that the Cy in this case is rather close to the Cx. This ensures a complete safety with this type of operation. The converging arrangement of the propellers enables, in the event of damage to one of the propulsion drives, the journey to be continued with a single propeller in a symmetrical flight configuration, with half the maximum thrust available.

As regards the means for controlling yaw, it was necessary to eliminate the aerodynamic rudders and ailerons since these are ineffectual at low speeds and/or for large angles of yaw. Moreover, they constitute a restraint and a disturbing and unstabilizing factor when heading into the wind. Finally, the free or "in jet" rudders and ailerons mounted at the rear and used for controlling yaw, introduce an adverse rolling moment, taking into account the fact that they generally have to be situated considerably above the centre of gravity of the vehicle. The jet rudders and ailerons whose effectiveness can be acceptable at average speeds, cannot be used for berthing or swinging manoeuvres at zero speed.

Devices which use differential pitch on two propellers having parallel axes arranged on either side of the longitudinal plane of symmetry, have the disadvantage that the total thrust available, and therefore the maximum speed possible is appreciably diminished. They have the further disadvantage of rendering problematical, in conditions limited by the condition of the water and/or side wind, the acceleration through the hump speed (bosse de dejaugeage). In addition, the pitch variation mechanisms work continuously and their reliability is much affected thereby.

Devices which employ orientation of the propeller supports, have the major disadvantage of requiring a complex control arrangement.

According to another feature of the invention, yaw control means is provided which comprises a faired, multiblade, variable pitch rotor arranged at the rear part of the vehicle, the rotor having its axis of rotation substantially perpendicular to the plane of symmetry of the vehicle.

This device enables yawing to be controlled in a simple manner and functions independently of the propellers which are exclusively reserved for the creation of the cruising thrust and of the lateral forces applied at the centre of gravity during manoeuvring.

Figure 2:
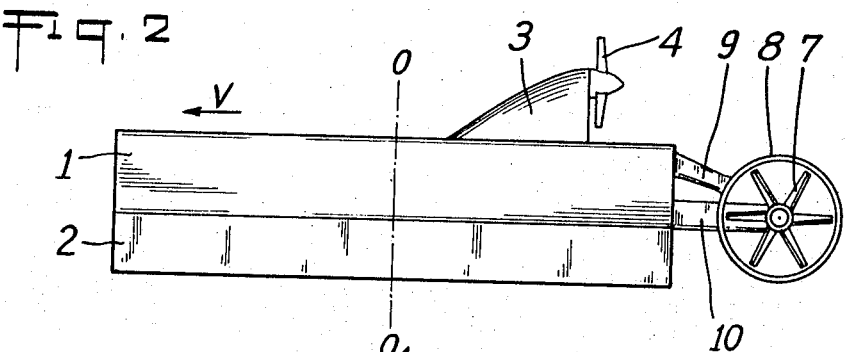
Figure 3:
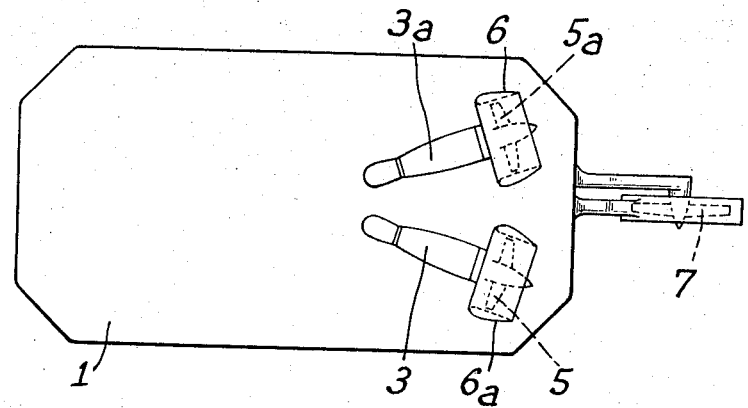

In order that the invention may be more readily understood, several embodiments thereof will now be described, only by way of example, with reference to the accompanying drawings, in which:

FIG. 1 is a plan view of one embodiment of air-cushion vehicle illustrating the propulsion and steering means in accordance with this invention, FIG. 2 is a side elevation of the vehicle shown in FIG. 1, and FIG. 3 is a plan view of another embodiment of air-cushion vehicle, provided with faired propellers arranged in accordance with this invention.

Referring to FIGS. 1 and 2, there is shown diagrammatically an air-cushion vehicle, which travels forwards in the direction of the arrow V, and which comprises a body 1 enclosing the passenger and/or cargo compartments, the engines, the pilot's cabin and the means ensuring the delivery of fluid under pressure to the support cushion. This body 1 is provided in known manner at its lower part with a flexible skirt 2 defining an enclosure which confines the cushion of pressure fluid.

On the upper part of the body 1, there are arranged two support members 3, 3a on which there are rotatably mounted two overhead propellers 4, 4a, driven by driving members arranged in the body 1. These propellers 4, 4a, which serve for driving the vehicle, are situated at the rear of the vehicle and arranged symmetrically with respect to the longitudinal axis $xx_1$ of the latter.

The axes $yy_1$ and $zz_1$ of the propellers form an acute angle $\alpha$ with the longitudinal axis $xx_1$ of the vehicle and converge towards and intersect at a point on the vertical axis $00_1$ situated at or adjacent the centre of gravity.

If the pitches of the propellers 4, 4a are adjusted in such a way that the propeller 4a has a positive pitch and produces a thrust OA and the propeller 4 has a reverse pitch and produces a thrust OB, a transverse resultant OR applied to the axis $OO_1$ through the centre of gravity of the vehicle, is obtained.

Conversely, if the propeller 4 has a positive pitch, it produces a thrust OA' whilst the propeller 4a with a reverse pitch produces a thrust OB', the two thrusts OA' and OB' producing a resultant OR' opposed to the resultant OR.

Generalising, the adjustment of the pitches of the two propellers in one direction then in the other, enables a variable resultant, applied to the centre of gravity and capable of being directed in any azimuth from 0° to 360°, to be obtained.

The angular divergence $\alpha$ of the axes of the propellers with respect to the plane of symmetry can be more particularly ± 18°. This angle can, however, be reduced substantially in the embodiment shown in FIG. 3 where the propellers 5, 5a are mounted in shaped fairings 6, 6a, and have a smaller diameter than the free propellers of the embodiment shown in FIGS. 1 and 2.

In accordance with another feature of the invention, the vehicle is provided at its rear end and on the outside with a multi-blade rotor 7 rotatably mounted in a fairing 8 fixed on the body 1 by arms 9. The multi-blade rotor 7, which is driven by a driving member arranged in the body 1 through a transmission 10, is provided with variable pitch blades. The rotor 7, whose axis $tt_1$ is perpendicular to the longitudinal axis $xx_1$ of the vehicle or to the plane of symmetry, enables, according to the pitch adopted by the pilot, a transverse thrust directed along the double arrow $CC_1$ (FIG. 1) and applied to the rear exterior of the vehicle to be created for controlling yaw.

Whilst particular embodiments have been described, it will be understood that various modifications may be made without departing from the scope of the invention as defined in the appended claims.

I claim:

1. In an air cushion vehicle, propulsion-steering and yaw control apparatus including, respectively, a pair of overhead driving propellers disposed at the rear of the vehicle symmetrically with respect to the longitudinal axis of the vehicle with the axis of the propellers forming acute angles with the longitudinal axis of the vehicle and converging towards and intersecting at a point on the vertical axis of symmetry of the vehicle situated at or adjacent the center of gravity of the vehicle, and a faired, multi-blade variable pitch rotor arranged at the rear part of the vehicle, said rotor having its axis of rotation substantially perpendicular to the plane of symmetry of the vehicle whereby the rotating blades of the rotor are in the longitudinal plane of symmetry of the craft.

2. Apparatus according to claim 1, wherein, by adjusting the pitches of the two propellers in one direction or in the other, thrusts are obtained of which the resultant, which is variable in magnitude and direction, is applied at the centre of gravity.

3. Apparatus as claimed in claim 1, wherein the propellers are arranged in a profiled fairing whereby the propellers may be of smaller diameter and the angular divergence of the axes of the propellers with respect to the plane of symmetry may be reduced.

* * * * *

UNITED STATES PATENT OFFICE
CERTIFICATE OF CORRECTION

PATENT NO. : 3,802,532
DATED : APRIL 9, 1974
INVENTOR(S) : ANDRE GRIHANGNE

It is certified that error appears in the above-identified patent and that said Letters Patent are hereby corrected as shown below:

Item [30] Foreign Application Priority Data
should read --- November 4, 1970  France.........70.39704 ---.

Signed and sealed this 20th day of May 1975.

(SEAL)
Attest:

RUTH C. MASON
Attesting Officer

C. MARSHALL DANN
Commissioner of Patents
and Trademarks